(12) United States Patent
Baseman et al.

(10) Patent No.: US 8,594,821 B2
(45) Date of Patent: Nov. 26, 2013

(54) DETECTING COMBINED TOOL INCOMPATIBILITIES AND DEFECTS IN SEMICONDUCTOR MANUFACTURING

(75) Inventors: Robert J. Baseman, Brewster, NY (US); Fateh A. Tipu, Wappingers Falls, NY (US); Sholom M. Weiss, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 13/030,324

(22) Filed: Feb. 18, 2011

(65) Prior Publication Data

US 2012/0215335 A1 Aug. 23, 2012

(51) Int. Cl.
*G06F 19/00* (2011.01)
*G06F 17/00* (2006.01)

(52) U.S. Cl.
USPC ............. 700/108; 700/99; 700/109; 700/110; 700/179; 700/121; 700/101; 702/81; 702/84; 702/30

(58) Field of Classification Search
USPC ...................................... 700/108; 702/81, 84
See application file for complete search history.

(56) References Cited

U.S. PATENT DOCUMENTS

| | | | |
|---|---|---|---|
| 6,529,789 B1 * | 3/2003 | Campbell et al. ............. | 700/115 |
| 6,580,960 B1 * | 6/2003 | Nicholson ..................... | 700/121 |
| 6,766,258 B1 * | 7/2004 | Stewart et al. .................. | 702/35 |
| 6,959,224 B2 * | 10/2005 | Good et al. ...................... | 700/97 |
| 7,315,765 B1 * | 1/2008 | Ranft et al. .................... | 700/108 |
| 7,401,066 B2 * | 7/2008 | Beinglass et al. ............. | 716/136 |
| 7,539,585 B2 | 5/2009 | Baseman et al. | |
| 7,650,251 B2 | 1/2010 | Baseman et al. | |
| 7,778,798 B2 * | 8/2010 | Ang et al. ....................... | 702/182 |
| 7,953,689 B2 * | 5/2011 | Barbee ............................ | 706/47 |
| 2006/0282189 A1 * | 12/2006 | Akisawa et al. ............... | 700/110 |
| 2008/0033589 A1 * | 2/2008 | Ontalus et al. ................ | 700/109 |
| 2008/0155045 A1 * | 6/2008 | Koyama ........................ | 709/206 |
| 2008/0201009 A1 * | 8/2008 | Brendler et al. .............. | 700/174 |
| 2009/0149979 A1 * | 6/2009 | McGahay ...................... | 700/101 |

OTHER PUBLICATIONS

Blackwell, M., "Multiple Hypothesis Testing: The F-test", Dec. 3, 2008.

* cited by examiner

*Primary Examiner* — Ryan A. Jarrett
*Assistant Examiner* — Olvin Lopez Alvarez
(74) *Attorney, Agent, or Firm* — Scully, Scott, Murphy & Presser, P.C.; Daniel P. Morris, Esq.

(57) ABSTRACT

A system, a method and a computer program product for identifying incompatible manufacturing tools. The system receives measurements of products that were subject to a manufacturing process involving a plurality of manufacturing tools. The measurements pertain to a performance characteristic of each product. The system evaluates whether each manufacturing tool implemented in a sequential manufacturing process individually performs normally based on the received measurements. In response to evaluating each manufacturing tool implemented in said manufacturing process individually performs normally, the system evaluates whether a first combination of the manufacturing tools together in sequential manufacturing process perform normally based on the received measurements. The system further evaluates performance of products generated by all other combinations of tools in the sequential manufacturing process not including the first combination of tools, and, using objective measures, identifies a combination of tools that perform optimally.

21 Claims, 7 Drawing Sheets

|  | TS_A | TS_B | ... | Target Measure |
|---|---|---|---|---|
| Wafer$_1$ | 1 | 1 | ... | 540 |
| Wafer$_2$ | 0 | 1 | ... | 570 |
| ... | ... | ... | ... | ... |
| Wafer$_N$ | 1 | 0 | ... | 565 |

DETECTING COMBINED TOOL
INCOMPATIBILITIES AND DEFECTS IN
SEMICONDUCTOR MANUFACTURING

BACKGROUND

The present application generally relates to identifying incompatible manufacturing tools. More particularly, the present application relates to identifying a combination of incompatible manufacturing tools that function together in a sequential process to produce a product, when each of those manufacturing tools individually, on average, works properly, but the sequential combination of the tools together produces bad or unacceptable product.

In current microelectronic products manufacture, for example, semiconductor wafer products, it is often the case that such products are produced by a sequential process involving tools that function in a sequence combination. For example, wafers may be produced according to a process that includes at least two sequential steps involving a tool A in a step 1, and a tool B in a step 2, for example. At various times, tool A implemented in the first step may comprise a tool such as A1, A2 A3, while tool B implemented in the second step may be a tool such as B1, B2. While each of these various tools, may individually function properly, on average, it is the case that wafers produced by a particular combination of tools that act in the sequence, e.g., A3, B2 that may produce unacceptable product, i.e., products that do not perform within a normal or acceptable range, on average, e.g., as determined according to certain performance criteria, e.g., wafer yield, speed.

Currently used analytical methods or procedures do not identify manufacturing tools that operate independently to produce acceptable product within a normal range, on average, but, when performing in a sequential combination, produce unacceptable product.

It would be highly desirable to provide the ability to identify manufacturing tools that operate independently, i.e., within a normal range, on average, but, when performing in a sequential combination, produce unacceptable product.

SUMMARY OF THE INVENTION

The present disclosure describes a system, method and computer program product for detecting a combination of manufacturing tools that work acceptably, on average, on their own, but produce bad or unacceptable product when operatively combined during a sequential manufacturing process.

In one embodiment, there is provided a system for identifying a combination of sequential manufacturing tools that perform to produce an unacceptable product out of all possible combinations of sequential manufacturing tools used to produce that product in a manufacturing process. The system includes a memory device and a processor device connected to the memory device. The system receives, e.g., from a database, measurements of products that were subject to a manufacturing process involving a plurality of manufacturing tools. The measurements pertain to a performance characteristic of each product. The system evaluates whether each manufacturing tool implemented in said manufacturing process individually performs properly based on the received measurements. In response to evaluating each manufacturing tool implemented in said manufacturing process individually performs properly, the system evaluates whether a product produced by a first combination of the manufacturing tools that together function in a sequence combination performs properly based on the received measurements. The system then evaluates whether products as produced by each other possible combination of tools, not including the first combination, that together function in the sequence combination, performs properly to produce product.

In a further embodiment, the system generates a notification message to notify a user, e.g., an engineer, which identified combination of the manufacturing tools performs poorly (e.g., abnormally).

In a further embodiment, to evaluate whether the combination of the manufacturing tools together performs properly, the system selects, among the received measurements, measurements of products that were produced according to a sequential process implemented by the first combination of manufacturing tools. The system computes a first average or a median of the selected measurements based on the first combination of tools operating in a sequence combination. The system then computes, based on the received measurements, an additional average or a median of measurements of products that were produced by all other combinations of tools not including the first combination of the manufacturing tool. The system computes at least one objective function over the computed first and additional averages or medians. The system repeats the selecting, the computing the first average or the median, the computing the additional average or the median, and the computing objective function for all products and all combinations of manufacturing tools. The system selects a combination of the manufacturing tools whose computed objective function is optimal.

In a further embodiment, to compute the at least one objective function, the system computes a difference between the computed first average and the computed additional average. The system computes a difference between the computed first median and the computed additional median. The system computes a statistical significance of the computed average difference or the computed median difference. The system repeats the computing the average difference, the computing the median difference and the computing the statistical significance for all combinations of the manufacturing tools, wherein the computed statistical significance of the selected combination of the manufacturing tools is a maximum among all computed statistical significances.

In a further embodiment, to compute the at least one objective function, the system computes a first mean squared error for measurements of products manufactured through the first combination of tools operating in a sequence combination. The system computes an additional mean squared error for measurements of products that were produced by all combination of tools not including the first combination of the manufacturing tools. The system sums the computed first mean squared error and the computed additional mean squared error. The system repeats the computing the first mean squared error, the computing the additional mean squared error, and the summing for all products and all combinations of the manufacturing tools, wherein a result of the summing for the selected combination of the manufacturing tools is a minimum among all results of the summing of all products and all combinations of the manufacturing tools.

In a further embodiment, to compute the at least one objective function, the system computes a first mean absolute deviation for measurements of products manufactured through a first combination of tools operating in a sequence combination. The system computes an additional mean absolute deviation for measurements of products that were produced by all combination of tools not including the first combination of the manufacturing tools. The system sums the computed first mean absolute deviation and the computed additional mean absolute deviation. The system repeats the computing the first mean absolute deviation, the computing the additional mean absolute deviation, and the summing for all products and all combinations of the manufacturing tools, wherein a result of the summing for the selected combination of the manufacturing tools is a minimum among all results of the summing of all products and all combinations of the manufacturing tools.

In a further embodiment, the products include one or more of: semiconductor chips, semiconductor wafers, semiconductor wafer lots.

In a further embodiment, the system and method may filter out one or more the combinations based on at least one constraint.

In one embodiment, the constraint includes one or more of: a minimum number of the products, a maximum single manufacturing tool divergence, a minimum number of semiconductor wafers, a minimum number of semiconductor wafer lots, a minimum divergence from an overall mean target, a ratio between products that were produced according to a manufacturing processes implemented by the first combination of the tools and products that were produced by all other combination of tools not including the first combination of the tools operating in the sequence combination.

BRIEF DESCRIPTION OF THE DRAWINGS

The accompanying drawings are included to provide a further understanding of the present invention, and are incorporated in and constitute a part of this specification.

DETAILED DESCRIPTION

Figures 4, 5:
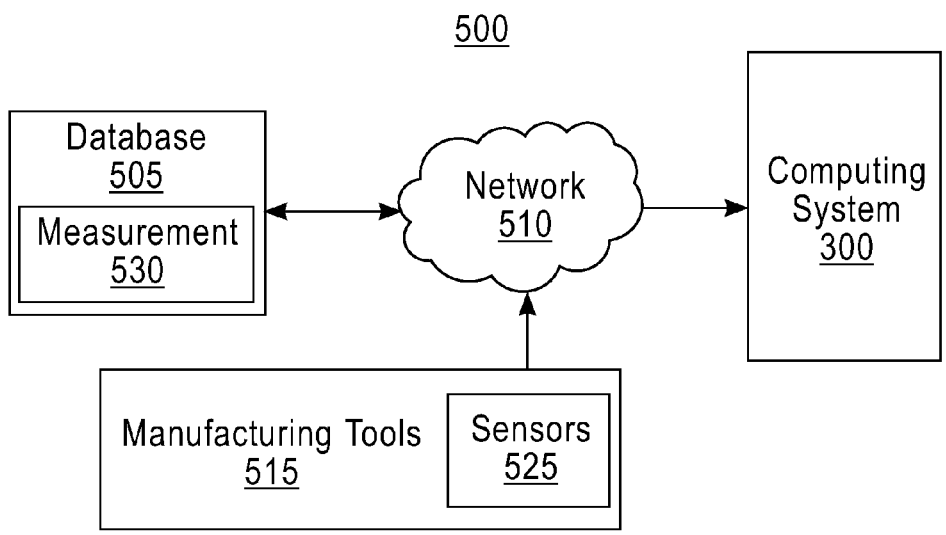
FIG. 4 is an exemplary table that describes measurements of products manufactured in one embodiment.
FIG. 5 illustrates a manufacturing environment where the present invention can be employed in one embodiment.

FIG. 5 illustrates an example manufacturing environment 500 in which the present invention can be employed in one embodiment. In this manufacturing environment 500, there exists a plurality of manufacturing tools 515. The manufacturing tools 515 include, but are not limited to: photo-lithographic tracks, etching tool, ion implanter, inspection and measurement tools 525, etc., which act sequentially or in combination to manufacturing a semiconductor product. The inspection and measurement tools 525 may include at least one sensor that measures physical characteristics of products being manufactured or already manufactured. The products include, but are not limited to: semiconductor chips, semiconductor wafers, and semiconductor wafer lots, etc. The measured physical characteristics, which are also called "quality measurements," for example microelectronic products, include, but are not limited to: electrical tests, chemical and physical test measurements, contamination measurements. For example, such quality measurements may include but are not limited to: clock speed or clock signal frequency, power consumption, leakage current, yield rate, etc.

The inspection and measurement tools 525 store the measurements (e.g., measurement 530), e.g., via a network 510 (Internet, intranet, wireless network, wired network, etc.), in a database 505 or other memory storage device (not shown), e.g., in a table format (e.g., a table 400 shown in FIG. 4) or other data structure format (e.g., an array, a linked list, heap, stack, vector, etc.). The table 400 in FIG. 4 illustrates a plurality of tool steps (e.g., tool step 405, tool step 410, etc.) in a row. A tool step refers to a manufacturing step, manufacturing tool and/or a manufacturing step performed by a manufacturing tool. The table 400 in FIG. 4 includes rows that represent products (e.g., wafer 1 (420), wafer 2 (425), etc.) that were operated on or subject to one or more of these tool steps. The row of the table 400 also includes a measurement (e.g., measurement 430) of products being manufactured or already manufactured through one or more of these tool steps. A value ("1" or "0") in each entry of the table 400 represents whether a corresponding product was produced according to a processes implemented by a corresponding tool step. For example, a value ("1") in a table entry 415 represents that a wafer 1 (420) were produced according to a processes implemented by a tool step 405. A value ("0") in a table entry 425 represents that a wafer (421) was produced by a manufacturing process not including a tool step 405.

Figure 3:
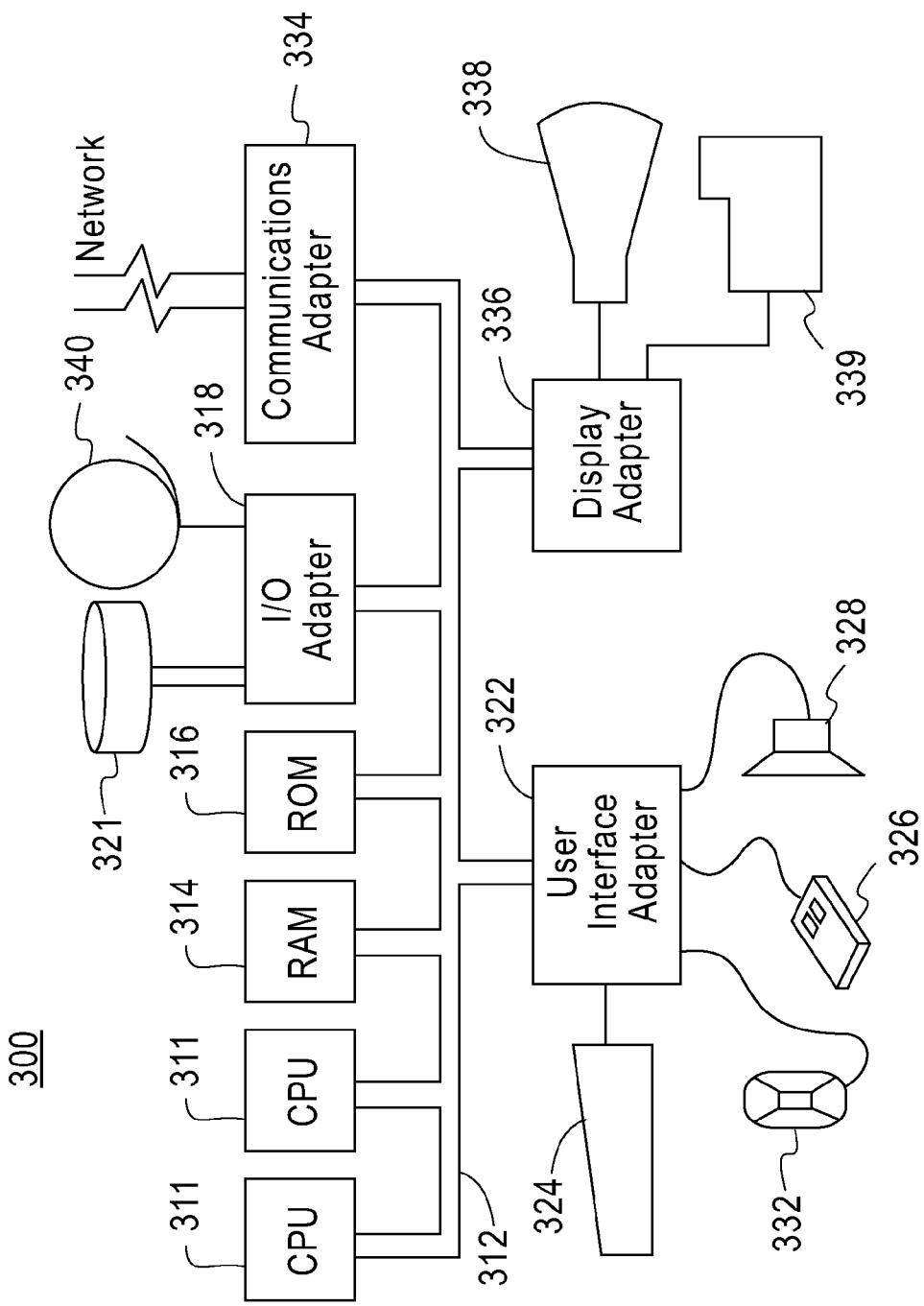
FIG. 3 illustrates an exemplary hardware configuration for implementing the flow chart depicted in FIGS. 1-2 in one embodiment.

Returning to FIG. 5, the manufacturing environment 500 further includes a computing system 300 that analyzes the measurements 530 to detect a defect in an individual manufacturing tool and/or in multiple manufacturing tools that act sequentially or act in parallel. FIG. 3 illustrates an exemplary hardware configuration of the computing system 300. The hardware configuration preferably has at least one processor or central processing unit (CPU) 311. The CPUs 311 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting the system 300 to a data processing network, the Internet, an Intranet, a local area network (LAN), etc., and a display adapter 336 for connecting the bus 312 to a display device 338 and/or printer 339 (e.g., a digital printer of the like).

Figure 1:
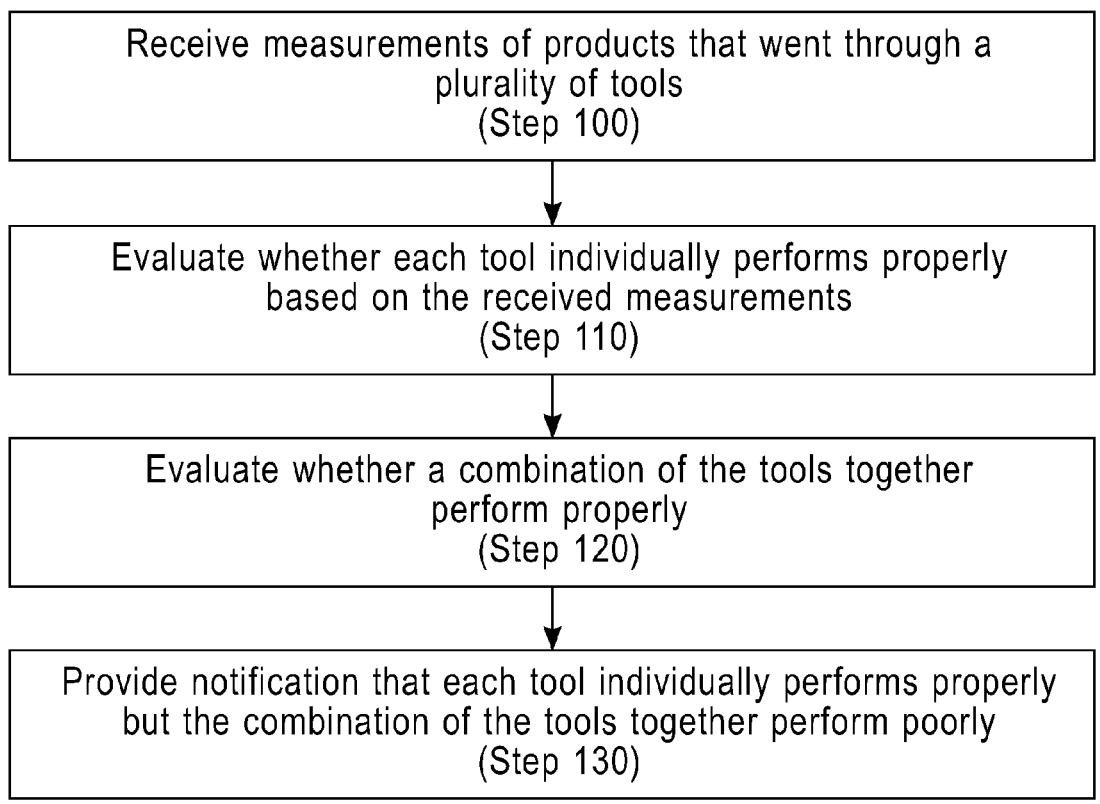
FIG. 1 is a flow chart that describes method steps for detecting a defect in manufacturing tools in one embodiment.

FIG. 1 is a flow chart that describes operations of the computing system 300 in one embodiment. At step 100, the computing system 300 retrieves or receives the measurements 530 (e.g., performance characteristic values) of products that have been manufactured through a plurality of tools from the database 505 or storage device (not shown), e.g., via the network 510. At step 110, the computing system 300 evaluates whether each manufacturing tool individually worked properly based on the measurements 530. Individually working properly or "normally" refers to working normally, i.e., on average performing within a "normal" range or producing products whose performance complies with their corresponding product specifications. For example, in one embodiment, Baseman et al., entitled "System and Method for rule-based data mining and problem detection for semiconductor fabrication," U.S. Pat. No. 7,650,251 B1, wholly incorporated by reference as if fully set forth herein, describes identifying a single manufacturing tool that performs poorly in a manufacturing process. For example, in one embodiment, it may be assumed that a tool step "A" (e.g., an etching step) is used in the production of, for example, 500 wafers in the production of semiconductor chips. Further assume that an average measurement (e.g., power consumption) of semiconductor chips in those 500 wafers is, for example, a certain power value, e.g., in mW. Further assume that an average measurement (e.g., power consumption) of semiconductor chips in other wafers (i.e., wafers that were produced by a manufacturing process not including the tool step "A") is another value that is larger by a pre-determined power threshold. Then, in this non-limiting example, the computing system may determine that there is a defect in the tool step "A" based on the difference between the average measurements Upon finding a potentially incompatible manufacturing tool (or potentially incompatible manufacturing tool step), the computing system notifies the incompatible manufacturing tool (or incompatible manufacturing tool step) to a user, e.g., an engineer, e.g., via an email, a text message, an instant message, etc. This tool would not even be considered for use in a process combination.

In general, as referred herein, "normal" or proper operation represents a target, e.g., a critical output test-measurement, being within a fixed number of standard deviations of the mean output value for all products, e.g., semiconductor wafers, produced in a recent sample. Typically the fixed number is one ("1") standard deviation (sd). The target may be a critical output test-measurement such as yield or speed. Use of term "abnormal" or poor operation is evaluated output outside this normal range. An actual number of sd for designating "normal" operation is configurable, e.g., may be designated by an engineering team.

Figure 6:
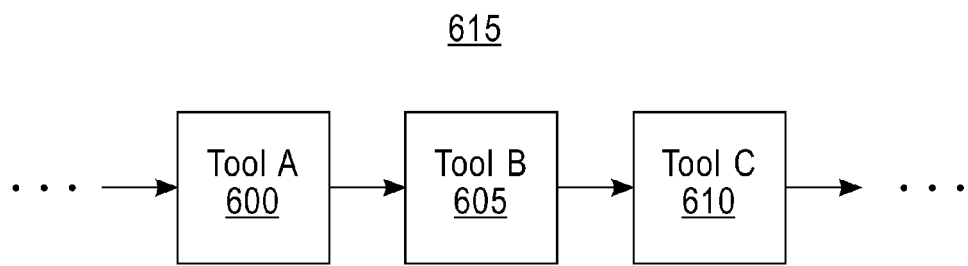
FIG. 6 illustrates exemplary combinations of manufacturing tools in one embodiment.

Returning to FIG. 1, at step 120, if every manufacturing tool individually works properly (e.g., manufacturing tools work within their tool specifications), as determined based on the measurements taken, the computing system evaluates whether all the combinations of manufacturing tools together work properly based on the measurements 530 and identifies a combination of tools that, in sequence, produce unacceptable product. FIG. 6 illustrates exemplary combinations of manufacturing tools in one embodiment. A manufacturing environment 615 includes, a plurality of manufacturing tools, e.g., Tool A (600), Tool B (605), Tool C (610), etc. Tool A (600) and Tool B (605) and Tool C (610) are sequentially connected and act sequentially in accordance with a sequential manufacturing process. Then, in this manufacturing environment 615, Tool A (600) and Tool B (605) are a "combination" of manufacturing tools. Tool B (605) and Tool C (610) are a combination of manufacturing tools. Tool A (600) and Tool C (610) are also a combination of manufacturing tools. A combination of manufacturing tools refers to at least two manufacturing tools that act sequentially. In one embodiment, the system automatically identifies all combinations of manufacturing tools in a manufacturing environment.

Figure 2:
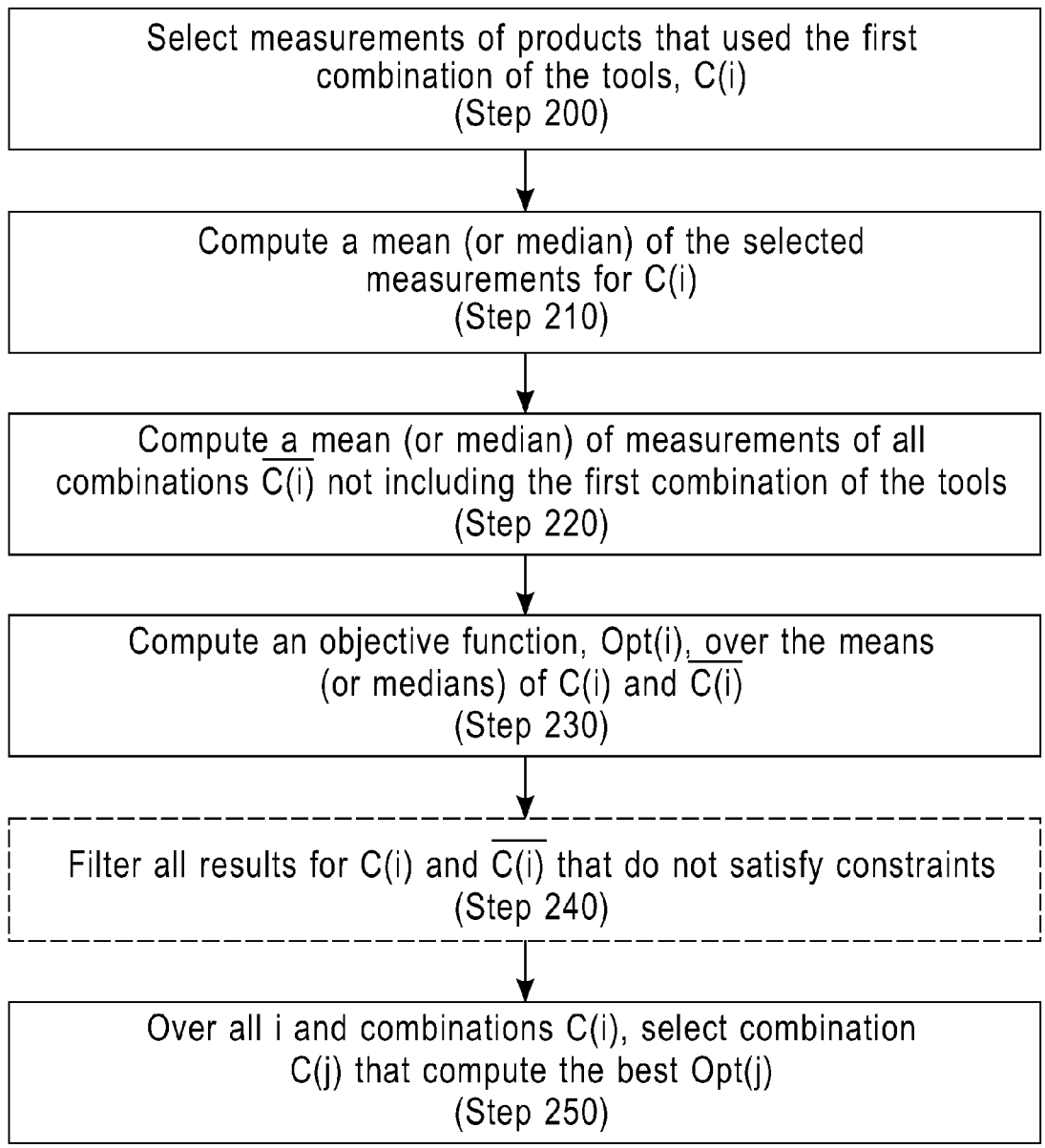
FIG. 2 is a flow chart that describes method steps for detecting a defect in manufacturing tools that work together in one embodiment.

In one embodiment, to evaluate whether a combination (i.e., any possible combination) of the manufacturing tools together work properly, the computing system 300 runs method steps illustrated in FIG. 2. The computing system may determine that a combination of the manufacturing tools together performs poorly if the performance of products produced through that combination of the manufacturing tools deviates, e.g., by a pre-determined amount such as 20%, from the performance of products produced through a set of manufacturing tools not including that combination of the manufacturing tools. At step 200, the computing system 300 selects, among the received measurements 530, measurements, e.g., associated with performance characteristics, of those products that manufactured through a first combination of manufacturing tools, "C(i)". At step 210, the computing system 300 computes an average or median of the selected measurements. At step 220, the computing system 300 computes, based on the received measurements 530, an average or median of measurements of products that were not manufactured through the first combination of the manufacturing tools. At step 230, the computing system 300 computes an objective function over the computed first average or median of the first combination and the computed additional average or median of each other combination. At step 240, the computing system 300 may filter out one or more the combinations based on at least one constraint. In the context of microelectronic product manufacture, the constraint may include, but is not limited to: a minimum number of the products, a maximum single manufacturing tool divergence, a minimum number of semiconductor wafers, a minimum number of semiconductor wafer lots, a minimum divergence from an overall mean target, a ratio between products that were produced according to a manufacturing processes implemented by the combination of the tools and products that were produced by a combination of tools not including one or more of the combination of the tools. Filtering step 240 is indicated as broken lines to refer that this step may be performed at any time during the process, for example, prior to computing the objective functions, or other times earlier in the process as shown.

At step 250, the computing system repeats steps 200-240 for all products and all possible combination of the manufacturing tools and selects a combination of the manufacturing tools whose computed objective function is optimal. That is, given a defined objective function (e.g., an mean squared error or absolute distance) computed for each tool combination implemented in the sequential process, including a computed objective function for the first combination of tools, "optimal" refers to an evaluation of that same objective function when computed for all other possible combination of tools in the sequential process is greater (or less, depending upon how the objective function is defined) than the computed objective function of the first combination of tools chosen (e.g., no other combination of tools that will compute an objective function less than the first one selected). How to select a combination of the manufacturing tools whose computed objective function is optimal is described below.

Figure 7:
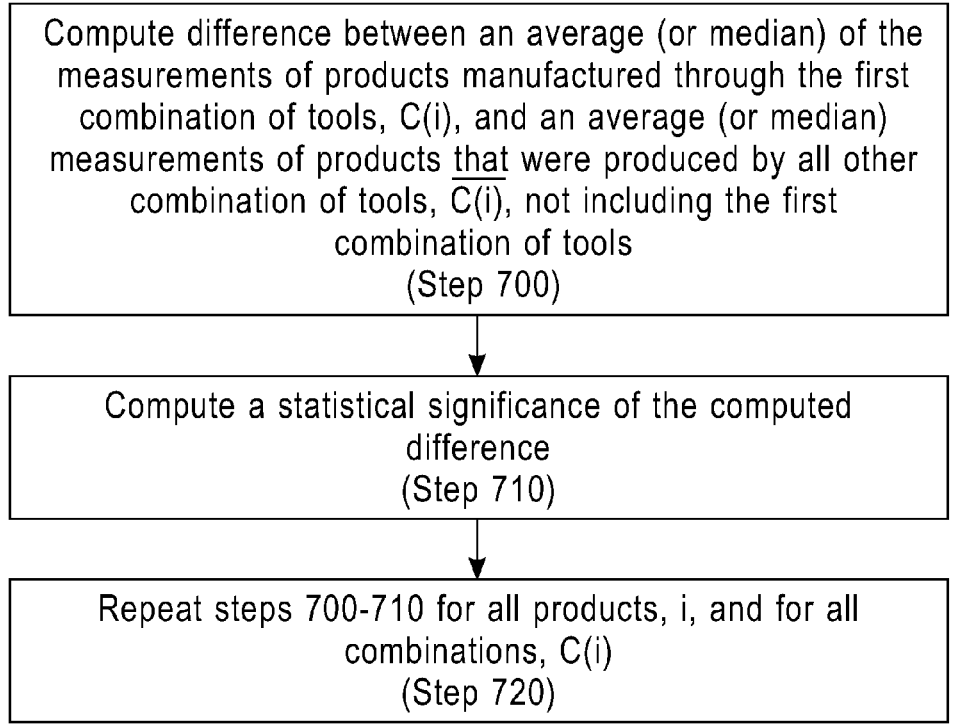
FIG. 7 is a flow chart to compute an objective function in one embodiment.

In a further embodiment, FIG. 7 illustrates method steps to compute the objective function (e.g., statistical t-test, etc.) in one embodiment. Statistical t-test compares two average values (or median values) and then determines statistical significance of the difference between the two average values (or the two median values). At step 700, the computing system 300 computes a difference between an average of measurements of products manufactured through the first combination of tools and an average of measurements of products that were produced by all other combinations of tools not including the first combination of the manufacturing tools. Alternatively, the computing system 300 computes a difference between a median of measurements of products manufactured through the first combination of tools and a median of measurements of products that were produced by all other combinations of tools not including the first combination of the manufacturing tools. At step 710, the computing system 300 computes a statistical significance of the computed difference (of the average measurement computations or the computed difference of the median computations. At step 720, the system repeats the computing of the average or median difference for a first combination, the computing of the average or median difference and the computing of the statistical significance for all products and all other combinations of the manufacturing tools. In one embodiment, the selected combination of the manufacturing tools, whose objective function is optimal, has a maximum statistical significance value among all computed statistical significances of all products and all combinations of the manufacturing tools.

Figure 8:
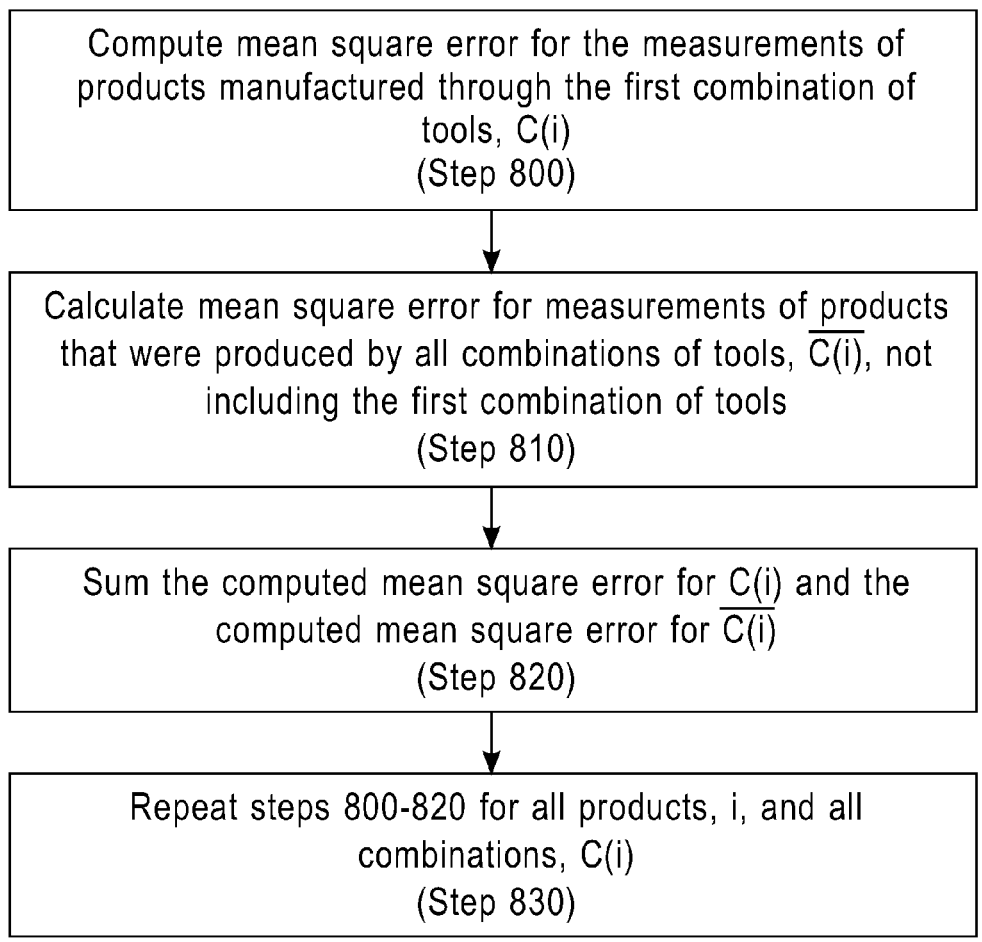
FIG. 8 is a flow chart to compute an objective function in another embodiment.

In another embodiment, FIG. 8 illustrates method steps to compute the at least one objective function. At step 800, the computing system 300 computes a mean squared error for measurements of products manufactured through the first combination of tools ("C(i)"). At step 810, the computing system 300 computes a mean squared error for the measurements of products that were produced by a combination of tools ("$\overline{C(i)}$") not including the first combination of the manufacturing tools. For example, if there are six measurements whose values are 11, 12, 13, 14, 15 and 16, an average of these measurement values is 13.5. The computing system 300 obtains a mean squared error of these measurements, e.g., by solving $\{(11-13.5)^2+(12-13.5)^2+(13-13.5)^2+(14-13.5)^2+(15-13.5)^2+(16-13.5)^2\}/6=17.6/6=2.93$ in this example described herein. At step 820, the computing system 300 sums the computed mean squared error for C(i) and the computed mean squared error for $\overline{C(i)}$. At step 830, the computing system 300 repeats computing the mean squared error for C(i), the computing the mean squared error for each, and the summing for all products and all combinations of the manufacturing tools. The selected combination of the manufacturing tools, whose objective function is optimal, has a minimum among all results of the summing of all products and all combinations of the manufacturing tools involved in manufacturing of each product. In this embodiment, the objective function is the sum of the mean squared errors for the C(i) and the $\overline{C(i)}$ (iterated over all selections (combinations) of C(i)). That is, the computing system 300 computes an objective function for all products and for all combinations of manufacturing tools. In one embodiment, the solution of the objective function of the selected combination of the manufacturing tools has a minimum value among all solutions of all objective functions of all combinations of the manufacturing tools.

Figure 9:
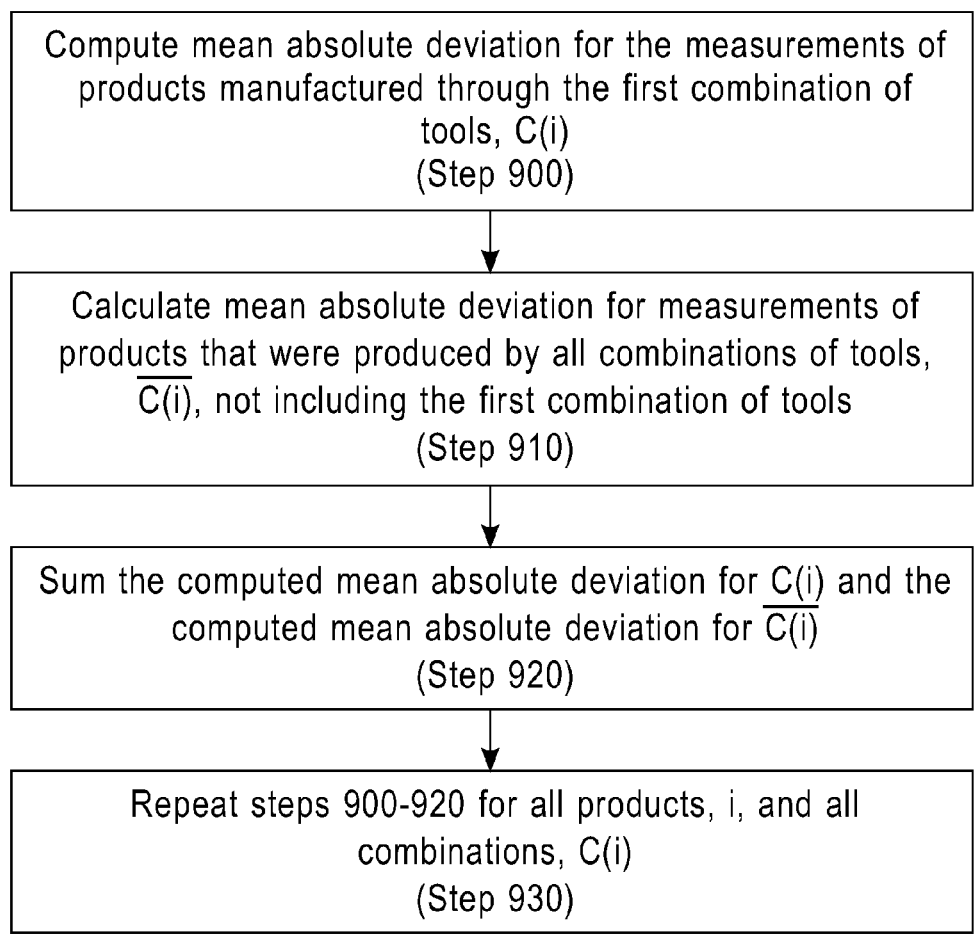
FIG. 9 is a flow chart to compute an objective function in another embodiment.

In another embodiment, FIG. 9 illustrates method steps to compute the at least one objective function. At step 900, the computing system 300 computes a mean absolute deviation for measurements of products manufactured through the first combination of manufacturing tools ("C(i)"). At step 910, the computing system 300 calculates a mean absolute deviation for the measurements of products that were produced by a combination of tools ("$\overline{C(i)}$") not including the first combination of the manufacturing tools. For example, if there are six measurements whose values are 11, 12, 13, 14, 15 and 16, an average of these measurement values is 13.5. The computing system 300 obtains a mean absolute deviation of these measurements, e.g., by solving $\{|11-13.5|+|12-13.5|+|13-13.5|+|14-13.5|+|15-13.5|+|16-13.5|\}/6=1.5$ in this example described herein. At step 920, the computing system 300 sums the computed mean absolute deviation for C(i) and the computed mean absolute deviation for $\overline{C(i)}$. At step 930, the computing system 300 repeats the computing the mean absolute deviations, and the summing for all products and all combinations of the manufacturing tools. In one embodiment, the selected combination of the manufacturing tools, whose objective function is optimal, has a minimum among all results of the summing of all products and all combinations of the manufacturing tools involved in manufacturing of each product. In this embodiment, the objective function is the sum of the mean absolute deviation for the C(i) and the $\overline{C(i)}$ (iterated over all selections (combinations) of C(i)). The computing system 300 computes an objective function for all products and for all combinations of manufacturing tools. The solution of the objective function of the selected combination of the manufacturing tools has a minimum value among all solutions of all objective functions of all combinations of the manufacturing tools.

Returning to FIG. 1, after selecting a combination of manufacturing tools whose objective function is optimal as described above, at step 130, the computing system notifies an engineer that each of those manufacturing tools individually works properly but that combination of those manufacturing tools together work poorly. Then, the engineer may inspect those manufacturing tools to find out the reasons(s) of their poor performance, e.g., by reviewing performance results of products manufactured by the tools.

In one embodiment directed to a non-limiting example of a manufactured microelectronic product, the computing system identifies a combination of manufacturing tools that perform the worst subject to a predefined criteria (e.g., a predetermined clock signal frequency, a predetermined leakage current, a predetermined power consumption, a predetermined yield rate, etc.), e.g., by comparing measurements of all the combination of manufacturing tools against the predefined criteria and then by finding a combination of manufacturing tools whose measurements deviate the most from the predefined criteria. Then, the computing system notifies the worst-performing combination of manufacturing tools to engineer(s), e.g., by an email, text message, instant message, etc. For example, in FIG. 6, measurements of wafers that were manufactured through the combination of Tool A (600) and Tool B (605) may be, for example, 70% yield rate. On the other hand, measurements of all other wafers that were manufactured through all other combinations of manufacturing tools may be result in yield rates higher than 80%. For example, measurements of wafers that were manufactured through the combination of Tool B (605) and Tool C (610) may result in, for example, an 85% yield rate. Measurements of wafers that were manufactured through the combination of Tool A (600) and Tool C (610) may be, for example, 90% yield rate. Then, the computing system 300 is configured to decide that the combination of Tool A (600) and Tool B (605) performs the worst subject to "yield rate" criterion.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

What is claimed is:

1. A method for identifying an incompatible combination of manufacturing tools in a manufacturing facility, the method comprising:

receiving measurements of products that were subject to a manufacturing process involving a plurality of manufacturing tools, said measurements pertaining to a performance characteristic of each product;

evaluating whether each manufacturing tool implemented in said manufacturing process individually performs normally, on average, when implemented in a sequential combination with other tools, based on the received measurements;

responsive to evaluating each manufacturing tool implemented in said manufacturing process individually performs normally, evaluating whether a first combination of the manufacturing tools operating together in a sequential process perform normally based on the received measurements, said evaluating said first combination comprising:

selecting, among the received measurements, measurements of products that were produced according to a sequential process implemented by the first combination of manufacturing tools;

computing a first average or a first median of the selected measurements of products produced by the first combination of manufacturing tools;

computing, based on the received measurements, an additional average or an additional median of measurements of products that were produced according to said sequential process by each combination of tools not including the first combination of the manufacturing tools;

computing at least one objective function over the computed first average or median and the computed additional average or median;

repeating the selecting, the computing the first average or the median, the computing the additional average or the median, and the computing objective function for all products and all combinations of manufacturing tools; and selecting a combination of the manufacturing tools whose computed objective function is optimal; and generating a notification message, based on the evaluating that each manufacturing tool individually performs normally but the first combination of the tools perform abnormally, wherein a computing system including at least one processor and memory device performs one or more of: the receiving, the evaluating whether each manufacturing tool individually performs normally, the evaluating whether the first combination of the manufacturing tools together perform normally, and generating the notification message.

2. The method according to claim 1, wherein the product is a microelectronic product performed according to a semiconductor manufacturing process, said product performance characteristic measurements include a performance attribute including one or more of: clock speed of said product, operating frequency of said product, power consumption of said product, leakage current of said product, and product yield rate.

3. The method according to claim 1, wherein computing the at least one objective function includes:

computing a difference between the first computed average or median and a respective the additional computed average or additional median; and computing a statistical significance of the computed difference;

repeating the computing the difference of the computed first average and additional average, the computing the difference of the computed first median and additional median and the computing the statistical significance for all products and all combinations of the manufacturing tools, wherein the computed statistical significance of the selected combination of the manufacturing tools is a maximum among all computed statistical significances.

4. The method according to claim 1, wherein computing the at least one objective function includes:

computing a first mean squared error for measurements of products manufactured through the first combination of tools;

computing an additional mean squared error for measurements of products that were produced by each combination of tools not including the first combination of the manufacturing tools;

summing the first computed mean squared error and the additional computed mean squared error;

repeating the computing the first mean squared error, the computing the additional mean squared error, and the summing for all products and all combinations of the manufacturing tools; and wherein a result of the summing for the selected combination of the manufacturing tools is a minimum among all results of the summing of all products and all combinations of the manufacturing tools.

5. The method according to claim 1, wherein computing the at least one objective function includes:

computing a first mean absolute deviation for measurements of products manufactured through the first combination of tools;

computing an additional mean absolute deviation for measurements of products that were produced by a combination of tools not including the first combination of the manufacturing tools;

summing the first computed mean absolute deviation and the computed additional mean absolute deviation;

repeating the computing the first mean absolute deviation, the computing the additional mean absolute deviation, and the summing for all products and all combinations of the manufacturing tools; and wherein a result of the summing for the selected combination of the manufacturing tools is a minimum among all results of the summing of all products and all combinations of the manufacturing tools.

6. The method according to claim 1, further comprising:

filtering one or more acceptable tool combinations based on at least one constraint.

7. The method according to claim 6, wherein the products include one or more of: semiconductor chips, semiconductor wafers, and semiconductor wafer lots.

8. The method according to claim 7, wherein the product is a semiconductor product performed according to a semiconductor manufacturing process, the filtering constraint includes one or more of:

a minimum number of the products, a maximum single manufacturing tool divergence, a minimum number of semiconductor wafers, a minimum number of semiconductor wafer lots, a minimum divergence from an overall mean target, a ratio between products that were produced according to a manufacturing processes implemented by the first combination of the tools and products that were produced by each combination of tools not including the first combination of the tools.

9. A system for identifying a incompatible combination of manufacturing tools in a manufacturing facility, the system comprising:

a memory device;

a processor device connected to the memory device;

the processor device is configured to:

receive measurements of products that were subject to a manufacturing process involving a plurality of manufacturing tools, said measurements pertaining to a performance characteristic of each product;

evaluate whether each manufacturing tool implemented in said manufacturing process individually performs normally, on average, when implemented in a sequential combination with other tools, based on the received measurements;

in response to evaluating each manufacturing tool implemented in said manufacturing process individually performs normally, evaluate whether a first combination of the manufacturing tools together perform normally based on the received measurements, wherein to evaluate, said processor device is configured to:

select, among the received measurements, measurements of products that were produced according to a sequential process implemented by the first combination of manufacturing tools;

compute a first average or a first median of the selected measurements of products produced by the first combination of manufacturing tools;

compute, based on the received measurements, an additional average or an additional median of measurements of products that were produced according to said sequential process by each combination of tools not including the first combination of the manufacturing tools;

compute at least one objective function over the computed first average or median and the computed additional average or median;

repeat the selecting, the computing the first average or the median, the computing the additional average or the median, and the computing objective function for all products and all combinations of manufacturing tools; and select a combination of the manufacturing tools whose computed objective function is optimal; and generate a notification message, based on the evaluating that each manufacturing tool individually performs normally but the first combination of the tools together perform abnormally.

10. The system according to claim 9, wherein the product is a microelectronic product performed according to a semiconductor manufacturing process, said product performance characteristic measurements include a performance attribute including one or more of: clock speed, operating frequency, power consumption, leakage current, and product yield rate.

11. The system according to claim 10, wherein to compute the at least one objective function, the processor is further configured to:

compute a difference between the first computed average or median and a respective the additional computed average or median; and compute a statistical significance of the computed difference;

repeat the computing of the difference of the computed first average and additional average, the computing of the difference of the computed first median and additional median and the computing of the statistical significance for all products and all combinations of the manufacturing tools, wherein the computed statistical significance of the selected combination of the manufacturing tools is a maximum among all computed statistical significances.

12. The system according to claim 10, wherein to compute the at least one objective function, the processor is further configured to:

compute a first mean squared error for measurements of products manufactured through the first combination of tools;

compute an additional mean squared error for measurements of products that were produced by each combination of tools not including the first combination of the manufacturing tools;

sum the first computed mean squared error and the additional computed mean squared error;

repeat the computing the first mean squared error, the computing the additional mean squared error, and the summing for all products and all combinations of the manufacturing tools; and wherein a result of the summing for the selected combination of the manufacturing tools is a minimum among all results of the summing of all products and all combinations of the manufacturing tools.

13. The system according to claim 10, wherein to compute the at least one objective function, the processor is further configured to:

compute a first mean absolute deviation for measurements of products manufactured through the first combination of tools;

compute an additional mean absolute deviation for measurements of products that were produced by a combination of tools not including the first combination of the manufacturing tools;

sum the first computed mean absolute deviation and the computed additional mean absolute deviation;

repeat the computing the first mean absolute deviation, the computing the additional mean absolute deviation, and the summing for all products and all combinations of the manufacturing tools; and wherein a result of the summing for the selected combination of the manufacturing tools is a minimum among all results of the summing of all products and all combinations of the manufacturing tools.

14. The system according to claim 9, wherein the processor is further configured to:

filter one or more acceptable tool combinations based on at least one constraint.

15. The system according to claim 14, wherein the products include one or more of: semiconductor chips, semiconductor wafers, and semiconductor wafer lots.

16. The system according to claim 15, wherein the product is a semiconductor product performed according to a semiconductor manufacturing process, the filtering constraint including one or more of:

a minimum number of the products, a maximum single manufacturing tool divergence, a minimum number of semiconductor wafers, a minimum number of semiconductor wafer lots, a minimum divergence from an overall mean target, a ratio between products that were produced according to a manufacturing processes implemented by the first combination of the tools and products that were produced by each combination of tools not including the first combination of the tools.

17. A computer program product for identifying incompatible manufacturing tools, the computer program product comprising a storage medium, said storage medium not a propagating signal and readable by a processor and storing instructions run by the processor for performing a method, the method comprising:

receiving measurements of products that were subject to a manufacturing process involving a plurality of manufacturing tools, said measurements pertaining to a performance characteristic of each product;

evaluating whether each manufacturing tool implemented in said manufacturing process individually performs normally, on average, when implemented in a sequential combination with other tools, based on the received measurements;

responsive to evaluating each manufacturing tool implemented in said manufacturing process individually performs normally, evaluating whether a first combination of the manufacturing tools together perform normally based on the received measurements, said evaluating said first combination comprising:

selecting, among the received measurements, measurements of products that were produced according to a sequential process implemented by the first combination of manufacturing tools;

computing a first average or a first median of the selected measurements of products produced by the first combination of manufacturing tools;

computing, based on the received measurements, an additional average or an additional median of measurements of products that were produced according to said sequential process by each combination of tools not including the first combination of the manufacturing tools;

computing at least one objective function over the computed first average or median and the computed additional average or median;

repeating the selecting, the computing the first average or the median, the computing the additional average or the median, and the computing objective function for all products and all combinations of manufacturing tools; and selecting a combination of the manufacturing tools whose computed objective function is optimal; and generating a notification message, based on the evaluating that each manufacturing tool individually performs normally but the first combination of the tools together perform abnormally.

18. The computer program product according to claim 17, wherein the computing the at least one objective function includes:

computing a difference between the first computed average or median and a respective the additional computed average or median;

and computing a statistical significance of the computed difference;

repeating the computing the difference of the computed first average and additional average, the computing the difference of the computed first median and additional median and the computing the statistical significance for all products and all combinations of the manufacturing tools, wherein the computed statistical significance of the selected combination of the manufacturing tools is a maximum among all computed statistical significances.

19. The computer program product according to claim 17, wherein the computing the at least one objective function includes:

computing a first mean squared error for measurements of products manufactured through the first combination of tools;

computing an additional mean squared error for measurements of products that were produced by each combination of tools not including the first combination of the manufacturing tools;

summing the first computed mean squared error and the additional computed mean squared error;

repeating the computing the first mean squared error, the computing the additional mean squared error, and the summing for all products and all combinations of the manufacturing tools; and wherein a result of the summing for the selected combination of the manufacturing tools is a minimum among all results of the summing of all products and all combinations of the manufacturing tools.

20. The computer program product according to claim 17, wherein the computing the at least one objective function includes:

computing a first mean absolute deviation for measurements of products manufactured through the first combination of tools;

computing an additional mean absolute deviation for measurements of products that were produced by a combination of tools not including the first combination of the manufacturing tools;

summing the first computed mean absolute deviation and the computed additional mean absolute deviation;

repeating the computing the first mean absolute deviation, the computing the additional mean absolute deviation, and the summing for all products and all combinations of the manufacturing tools; and wherein a result of the summing for the selected combination of the manufacturing tools is a minimum among all results of the summing of all products and all combinations of the manufacturing tools.

21. The computer program product according to claim 17, further comprising:

filtering one or more acceptable tool combinations based on at least one constraint.

* * * * *